United States Patent Office 2,696,793
Patented Dec. 14, 1954

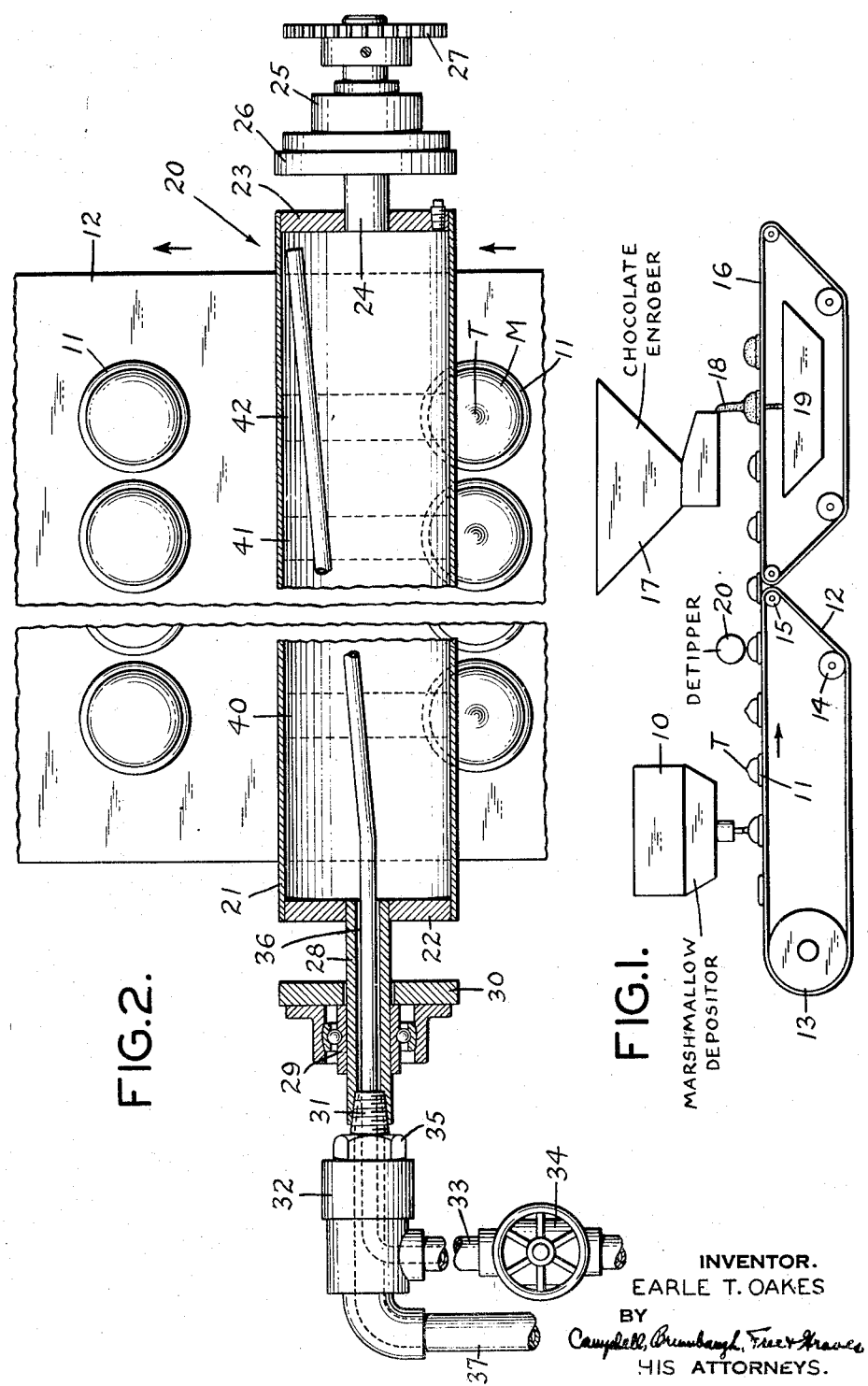

2,696,793

METHOD OF ELIMINATING THE TIPS LEFT BY DEPOSITING MARSHMALLOW AND THE LIKE ON COOKIES, CAKES, AND CONFECTIONS

Earle T. Oakes, Douglaston, N. Y., assignor to The E. T. Oakes Corporation, Islip, N. Y., a corporation of New York Application April 30, 1952, Serial No. 285,188

2 Claims. (Cl. 107—54)

This invention relates to methods for the manufacture of cakes, cookies and confections and it relates particularly to a method for eliminating the tips left by the depositing operation on marshmallow toppings and the like.

In the manufacture of marshmallow topped cookies, for example, several rows of cookies are passed beneath a depositing apparatus which applies a topping of marshmallow to each of the cookies. Due to the consistency of the marshmallow, the breaking of the stream of marshmallow flowing from the depositor to the cookie leaves an upstanding sharp tip on the topping. When the marshmallow topped cookie passes under an enrobing machine for the application of a layer of chocolate or the like to the topped cookie, the chocolate has a tendency to flow away from the tip and leave the end of the tip exposed. This leaves a white spot at the top of the cookie. The white spot is not only unsightly but it also forms an opening through which moisture in the marshmallow can escape and permit the marshmallow to dry out and become tough.

Furthermore, in packaging marshmallow goods, it is often necessary to flatten the tops either for the sake of appearances or to make the goods conform to the height of the package.

It has been proposed that the tip might be eliminated by pressing it down into the topping by means of a pressing pad or roll beneath which the topped cookie is moved. It was found, however, that unless the pad or the roller is kept moist, the marshmallow will stick to the pad or roller and more damage is done thereby than good. The principal difficulty in properly moistening the roll or pad to prevent sticking is to control the supply of water to the roll or pad. Because of changes in atmospheric humidity and the difficulty of distributing water uniformly along a pad or roll which may be three to four feet long, it has been found that portions of the roll or pad are insufficiently moistened to prevent sticking while, at other zones, so much moisture may be present that the surface of the marshmallow topping may be wetted undesirably. In the latter case, inasmuch as the cookies may be passed directly to an enrobing machine, the moistened marshmallow will ferment after enrobing, thereby rendering the cookies worthless. Moreover, the excess moisture on the top of the marshmallow may discolor the chocolate, giving the appearance of stale goods. Also, the moist pad or roll is unsanitary being quite difficult to keep sterile.

None of the prior apparatuses have been capable of maintaining a continuous operation without very frequent adjustment by the operator and even then, the results are not all that might be desired, for the reasons set forth above.

In accordance with the present invention, I have provided a method for controlling the moisture on, and the temperature of, a pressing member, such as a roller, beneath which the topped cookies and the like are passed in order to eliminate the tips on the toppings without permitting the marshmallow or the like to stick to the pressing member and without wetting the surface of the marshmallow appreciably.

More particularly, in accordance with the present invention, the method may be practiced with a hollow metal roll which is adjusted with respect to a conveyor or the like on which the freshly topped cookies or the like are moved to the enrobing machine so that the roll engages the tips on the cookies and presses the tips down into the topping. The roll is maintained in a moistened condition by introducing a refrigerant such as a chilled brine solution, ammonia gas or other refrigerating gas, chilled low freezing alcohol solution, or the like, to maintain the temperature of the roll below the dew point and preferably below the freezing point. By maintaining the roll below the freezing point (32° F.), atmospheric moisture is condensed on the surface of the roll and is frozen there as a layer of frost. When the roll is coated with frost, the frost is wiped from the roller and the cookies passed beneath the roller so that moisture condensing on the surface keeps the roll moist at the zones of contact of the topped cookies with the roller. Between the zones of contact, the moisture condensed from the atmosphere is frozen to frost or kept at a low concentration so that it does not flow into the contact zones and unduly increase the moisture content of these zones. In this way, a thin but continuous layer of moisture is kept on the roll at the zones where the cookies contact the roller so that the tips and the toppings themselves cannot stick to the roll and there is no excess moisture to transfer to the toppings so that subsequent fermentation is avoided. When the topped cookies are then passed to the enrobing machine, a uniform coating of the enrobing material can be applied to the exposed surfaces of the cookie and topping to form a substantially moisture proof sheath which prevents drying and toughening of the marshmallow.

For a better understanding of the present invention, reference may be had to the accompanying drawings in which:

Fig. 1 is a schematic illustration of a typical depositing, detipping and enrobing apparatus including a detipping roller for practicing the present invention; and Fig. 2 is a view partially in longitudinal cross-section of the detipping roller shown in a position overlying a conveyor on which rows of cookies are advanced from the depositor to the enrobing apparatus.

Referring now to Fig. 1, a typical topping and enrobing apparatus may include a depositor 10 by means of which the marshmallow or other similar material may be deposited on a series of rows of cookies 11 which are advanced continuously or intermittently on a conveyor belt 12. The belt is supported on suitable rollers 13, 14 and 15 for movement to transfer the cookies to a mesh conveyor 16. The mesh conveyor advances the topped cookies beneath a chocolate enrober 17 which may be of any desired type so that the topped cookies pass through a shower 18 of chocolate or the like which is collected in a reservoir or pan 19 and returned to a melting kettle or to the enrober for use therein.

A detipping roller 20 for practicing the present invention is interposed between the depositor 10 and the enrober 17 so that the tips T on the toppings M of the cookies are flattened down before the cookies are delivered past the enrober 17. The roller 20 may be located above the conveyor 12 or the conveyor 16 as may be desired.

Referring now to Fig. 2, the roller 20 includes a hollow cylindrical shell 21 having disc-like end plates 22 and 23. The end plate 23 carries a shaft 24 extending through a bearing 25 mounted on a supporting plate or bracket 26 carried by the frame (not shown) of the depositing or the enrobing device. The outer end of the shaft may be provided with a sprocket or gear 27 by means of which the roller 20 is rotated at about the same peripheral speed as the lineal speed of the conveyor 12 so that the cookies 11 with the toppings M and the tips T thereon move beneath the roller.

The end plate 22 may be provided with a tubular shaft 28 which is also mounted in a bearing 29 in an end plate or bracket 30. Threaded in the outer end of the tubular shaft 28 is a nipple 31 of a rotary coupling 32 through which a refrigerant liquid or gas is delivered by means of the conduit 33. The conduit 33 may be provided with a valve 34 to regulate the flow of refrigerant through the conduit 33. The conduit 33 is connected to a pipe 35 which extends through the nipple 31 and into the interior of the roll 20 so that the refrigerant is delivered into the far end of the roll, in the apparatus illustrated. The refrigerant is discharged around the outside of the pipe 35 through the space 36 between the pipe and the hollow shaft 28 and is discharged through the rotary coupling 32 and the discharge elbow and conduit 37 to be cooled and recirculated. In this way, a continuous flow and replacement of the refrigerant is provided to maintain the surface of the shell 21 at substantially a uniform temperature throughout its entire extent.

While the preferred apparatus provides for the introduction and discharge of the refrigerant at the same end of the roll 20, it will be understood that the refrigerant can be introduced at one end of the roll and discharged at the other, if desired.

In operation, a refrigerant is introduced into the roll in order to chill the roll and condense moisture on the surface of the roll. The cooling of the roll is important, aside from the condensation of moisture, because the marshmallow does not adhere as readily to a cold surface as it does to a warm surface. The temperature of the refrigerant may be between about 20° and 35° Fahrenheit, and preferably is below 32° F. so that the moisture is converted to frost. When the roll is entirely covered with frost, the depositing and enrobing machines and the roller 20 are set into operation and before the first row of topped cookies comes in contact with the roll, the frost is wiped from the surface of the roll leaving the surface of the roll cold and slightly moist so that the marshmallow toppings M will not stick to the roll as the cookies pass beneath it. Frost will begin to form again immediately on the roll but because the temperature of the toppings is at least at room temperature or higher, frost may or may not form at the zones 40, 41, 42, etc., on the roll which come in contact with the toppings. Frost may, and generally does, form between the zones and outside of the zones 40, 41, 42, etc., but this merely serves to trap excess moisture to avoid unduly moistening the toppings as the cookies move along. Indeed, the roller acts equally well when it is coated solidly with ice from one end to the other, as often happens in very moist climates. The roller acts to flatten down or eliminate the tips T so that when the cookies pass to the enrobing machine they have uniformly smooth surfaces to which the enrobing material clings without breaks therein to thereby seal the marshmallow against evaporation of the moisture therefrom.

It will be understood that the diameter and length of the roll can be varied depending upon the capacity of the depositing and enrobing machines and the conveyors associated therewith, and if desired, the refrigerated roller may take other forms than cylindrical.

I claim:

1. A method of flattening the tips left by depositing marshmallow toppings on edible articles such as cakes, confections and the like, comprising passing said edible articles with freshly deposited marshmallow toppings having upstanding soft tips thereon past a pressing member to engage the tips and press them down onto the topping, and refrigerating the pressing member to condense and freeze atmospheric moisture on the pressing member and maintain a cold surface on the pressing member and thereby maintain the pressing member moist and cold to prevent the tips from adhering to said pressing member.

2. A method of flattening the tips on freshly deposited marshmallow toppings and coatings on edible articles such as cakes, confections and the like, comprising refrigerating a hollow pressing member to form a layer of frost thereon, wiping the frost from the member, and then moving said edible articles past said member with their marshmallow tips engaging the member to press the tips down onto the edible articles, and continuing to refrigerate said member to condense a layer of moisture on the member at the zone of contact of the edible articles with the member.

References Cited in the file of this patent

UNITED STATES PATENTS

| Number | Name | Date |
|---|---|---|
| 1,575,213 | Kohler | Mar. 2, 1926 |
| 2,425,356 | Sticelber | Aug. 12, 1947 |